(12) United States Patent
Doblar et al.

(10) Patent No.: US 6,477,205 B1
(45) Date of Patent: Nov. 5, 2002

(54) DIGITAL DATA TRANSMISSION VIA MULTI-VALUED LOGIC SIGNALS GENERATED USING MULTIPLE DRIVE STATES EACH CAUSING A DIFFERENT AMOUNT OF CURRENT TO FLOW THROUGH A TERMINATION RESISTOR

(75) Inventors: Drew G. Doblar, San Jose; Leo Yuan, Los Altos, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/324,399

(22) Filed: Jun. 3, 1999

(51) Int. Cl.[7] .............................................. H04L 27/00

(52) U.S. Cl. ......................... 375/259; 395/286; 326/60

(58) Field of Search ................................ 375/288, 268, 375/353, 257, 258, 259, 286, 295, 316; 341/57; 326/60, 30, 82, 86

(56) References Cited

U.S. PATENT DOCUMENTS 3,126,537 A * 3/1964 Trampel ...................... 341/57
4,118,791 A 10/1978 Swain (List continued on next page.)

OTHER PUBLICATIONS

Knight, T.F. Jr.; Krymm, A. "A self–terminating low–voltage swing CMOS output driver" Solid–State Circuits, IEEE Journal of, vol. 23 #2, Apr. 1988 pp. 457–464.*
Conrad, H. "2.4 Gbit/s CML I/Os with integrated line termination resistors realized in 0.5 /spl mu/m BiCMOS technology" Bipolar/BiCMOS Circuits and Tech. Meeting, Proc., 1997 pp. 120–122.*

Mooney, R.; Dike, C.; Bokar, S. "A 900 Mb/s bidirectional signaling scheme" Solid–State Circuits, IEEE Journal of, vol. 30 #12, Dec. 1995 pp. 1538–1543.*
"Ternary Physical Protocol for Marilan, a Multiple–Access Ring Local Area Network", Proceedings of the 18th International Symposium on Multiple–Valued Logic, 1988, pp. 14–20.
Dally et al., *Digital Systems Engineering*, Cambridge Univ. Press, 1998, pp. 344–347.

*Primary Examiner*—Stephen Chin
*Assistant Examiner*—Chieh M. Fan
(74) *Attorney, Agent, or Firm*—B. Noël Kivlin

(57) ABSTRACT

A digital communication system is presented including at least one transmission line coupled between a first and second communication devices and used to convey binary data from the first communication device to the second communication device. A termination resistor and one end of the transmission line are coupled to an input node of the second communication device. An electrical voltage level existing at the input node of the second communication device may be substantially dependent upon an amount of electrical current flowing through the termination resistor. The termination resistor may have a value substantially equal to a characteristic impedance of the transmission line such that signal reflections and distortion occurring within the transmission line are substantially reduced. Three or more different voltage levels may be present upon the transmission line dependent upon the binary data. The resulting increase in data transmission capability may be used to reduce the total number of transmission lines coupled between the first and second communication devices, or to increase the rate at which the binary data is transmitted from the first communication device to the second communication device. The ternary signals may also be used to encode a clock signal with binary data upon one or more transmission lines such that a separate clock transmission line is not needed, and clock signal reception is ensured even in case of transmission line failure.

13 Claims, 9 Drawing Sheets

U.S. PATENT DOCUMENTS

| | | | | |
|---|---|---|---|---|
| RE30,182 E | * | 12/1979 | Howson | 375/290 |
| 4,280,221 A | | 7/1981 | Chun et al. | |
| 4,860,309 A | * | 8/1989 | Costello | 375/286 |
| 5,160,929 A | * | 11/1992 | Costello | 341/57 |
| 5,235,617 A | | 8/1993 | Mallard, Jr. | |
| 5,325,355 A | | 6/1994 | Oprescu et al. | |
| 5,444,740 A | * | 8/1995 | Mizukami et al. | 375/286 |
| 5,604,450 A | * | 2/1997 | Borkar et al. | 326/86 |
| 5,734,682 A | * | 3/1998 | Lukac-Kuruc | 375/286 |
| 5,811,984 A | * | 9/1998 | Long et al. | 326/30 |
| 5,815,100 A | * | 9/1998 | Rush et al. | 341/110 |
| 5,847,990 A | * | 12/1998 | Irrinki et al. | 365/154 |
| 5,872,471 A | * | 2/1999 | Ishibashi et al. | 327/98 |
| 5,872,813 A | | 2/1999 | Hui | |
| 6,140,841 A | * | 10/2000 | Suh | 329/60 |
| 6,147,963 A | * | 11/2000 | Walker et al. | 370/200 |

\* cited by examiner

DIGITAL DATA TRANSMISSION VIA MULTI-VALUED LOGIC SIGNALS GENERATED USING MULTIPLE DRIVE STATES EACH CAUSING A DIFFERENT AMOUNT OF CURRENT TO FLOW THROUGH A TERMINATION RESISTOR

BACKGROUND OF THE INVENTION

1. Field of the Invention

This invention relates to digital communication systems, and more particularly to unidirectional source-synchronous digital data transmission systems.

2. Description of the Relevant Art

Digital electronic devices typically communicate via electrical signals (e.g., voltages and/or currents) driven upon electrical conductors (e.g., metal wires). Operations within a digital electronic device transmitting data (i.e., a "sender") may be performed in response to (i.e., synchronized) by a first clock signal, and operations within another digital electronic device receiving the data (i.e., a "receiver") may be synchronized by a second clock signal. In order for the receiver to receive the data correctly and efficiently, the first and second clocks may need to be synchronized such data reception by the receiver occurs in unison with data transmission by the sender.

FIG. 1 is a diagram of a digital communication system 10 employing source-synchronous data transmission. A sender 12 is coupled to a receiver 14 via n data transmission lines 16 and a clock transmission line 18. Sender 12 includes n drivers 20 for driving one end of the n data transmission lines 16 according to binary data signals DATA1 through DATAn, and a driver 22 for driving one end of clock transmission line 18 according to a binary clock signal CLOCK. Sender 12 drives one of two voltage levels upon each of the n data transmission lines 16 dependent upon the logic value of the corresponding binary data signal. Similarly, sender 12 drives one of two voltage levels upon clock transmission line 18 dependent upon the logic value of clock signal CLOCK. Further, sender 12 drives data transmission lines 16 in synchronization with clock signal CLOCK (e.g., in response to a rising or falling transition or "edge" of CLOCK).

Receiver 14 includes n comparators 24 coupled to receive the voltage levels driven upon the n data transmission lines 16 by sender 12, and a comparator 26 coupled to receive the voltage levels driven upon clock transmission line 18 by sender 12. Each of the n comparators 24 and comparator 26 also receive a reference voltage level $V_{REF}$, where reference voltage level $V_{REF}$ is selected to be between the two voltage levels. Comparator 26 produces binary clock signal CLOCK at an output terminal. Receiver 14 also includes n flip-flops 28 receiving the outputs of the n comparators 24 at input terminals and clock signal CLOCK signal at control terminals. As a result, the n flip-flops 28 produce corresponding data signals DATA1 through DATAn in response to the CLOCK signal produced by comparator 26.

As the operating frequencies (i.e., "speeds") of digital electronic devices increase, electrical conductors used to route signals between components (i.e., signal lines) begin to behave like transmission lines. Transmission lines have characteristic impedances. If the input impedance of a receiving device connected to a transmission line does not match the characteristic impedance of the transmission line, a portion of an incoming signal is reflected back toward a sending device. Such reflections cause the received signal to be distorted. If the distortion is great enough, the receiving device may erroneously interpret the logical value of the incoming signal.

Binary digital signals typically have a low voltage level associated with a logic low (i.e., a logic "0"), a high voltage level associated with a logic high (i.e., a logic "1"), "rise times" associated with transitions from the low voltage level to the high voltage level, and "fall times" associated with transitions from the high voltage level to the low voltage level. A signal line behaves like a transmission line when the signal rise time (or signal fall time) is short with respect to the amount of time required for the signal to travel the length of the signal line (i.e., the propagation delay time of the signal line). As a general rule, a signal line begins to behave like a transmission line when the propagation delay time of the signal line is greater than about one-quarter of the signal rise time (or signal fall time).

Resistive "termination" techniques are often applied to transmission lines, and signal lines long enough to behave like transmission lines, in order to reduce reflections and the resultant signal distortion. One or more electrically resistive elements (e.g., resistors) may be inserted between a driver and an end of a transmission line in order to cause the effective output impedance of the driver to more closely match the characteristic impedance of the transmission line. Similarly, one or more electrically resistive elements may be coupled to an end of a transmission line at a receiver in order to cause the effective input impedance of the receiver to more closely match the characteristic impedance of the transmission line.

FIG. 2 is a diagram of a representative transmission line 30 coupled between sender 12 and receiver 14, wherein resistive terminations are employed in order to reduce signal reflections and distortion within transmission line 30. Transmission line 30 may be one of the n data transmission lines 16 or clock transmission line 18. Switching circuitry 32 within a driver of sender 12 switches a first end of transmission line 30 between a first power supply voltage level $V_{DD}$ and a second power supply voltage level $V_{SS}$ dependent upon a binary input signal (i.e., a binary data signal or binary clock signal CLOCK). It is noted that second power supply voltage level $V_{SS}$ may be a reference ground electrical potential, and $V_{DD}$ may be referenced to $V_{SS}$. A first termination resistor 34, having a value equal to the characteristic impedance $Z_O$ of transmission line 30, is connected between switching circuitry 32 and the first end of transmission line 30 in order to reduce signal reflections and distortion within transmission line 30.

A second end of transmission line 30 is connected a first input terminal of a comparator 36 within receiver 14. A second termination resistor 38, having a value equal to the characteristic impedance $Z_O$ of transmission line 30, is connected between the first input terminal of comparator 36 and power supply voltage level $V_{DD}$ in order to reduce signal reflections and distortion within transmission line 30.

When first termination resistor 34 and second termination resistor 38 are coupled to opposite ends of transmission line 30 in order to reduce signal reflections and distortion, they form a voltage divider network which restricts the range of voltage levels which may be used to convey binary signals from sender 12 to receiver 14. FIG. 3 is a graph of voltage levels V present within sender 12 and upon transmission 30 of FIG. 2. When switching circuitry 32 connects the first end of transmission line 30 to $V_{DD}$ through first termination resistor 34, a voltage level equal to $V_{DD}$ exists at the first end transmission line 30. When switching circuitry 32 connects the first end of transmission line 30 to $V_{SS}$ through first termination resistor 34, first termination resistor 34 and second termination resistor 38 are connected in series between $V_{DD}$ and $V_{SS}$, and a voltage level equal to $(V_{DD}/2)$ exists at the first end transmission line 30 (where $V_{DD}$ is referenced to $V_{SS}$). As a result, the two voltage levels used to convey binary signals from sender 12 to receiver 14, $V_{DD}$ and $(V_{DD}/2)$, exist only in an upper half of the voltage range between $V_{DD}$ and $V_{SS}$ as shown in FIG. 3. It is noted that a lower half of the voltage range between $V_{DD}$ and $V_{SS}$ is unused due to the use of both first termination resistor 34 and second termination resistor 38.

Reference voltage level $V_{REF}$, connected to a second input terminal of comparator 36 within receiver 14, is selected between the two voltage levels $V_{DD}$ and $(V_{DD}/2)$ as described above. Voltage values between $(V_{DD}/2)$ and $V_{REF}$ received at the first input terminal of comparator 36 may cause comparator 36 to produce a binary logic 0 signal at an output terminal, and voltage values between $V_{REF}$ and $V_{DD}$ received at the first input terminal of comparator 36 may cause comparator 36 to produce a binary logic 1 signal at the output terminal.

It would be beneficial to have a data transmission system which employs resistive termination of at least one transmission line coupled between a sender and a receiver, and wherein the at least one transmission line is capable of conveying one of k logic states, where k>2. Such increased data transmission capability could be used to reduce a total number of transmission lines coupled between the sender and the receiver, or to increase the rate at which binary data is transmitted from the sender to the receiver via the total number of transmission lines.

SUMMARY OF THE INVENTION

A digital communication system is presented which includes at least one transmission line coupled between a first communication device and a second communication device. The transmission line is used to convey binary data from the first communication device to the second communication device. At least one termination resistor, coupled to an end of a transmission line at the second communication device in order to reduce signal reflections and distortion, is also used to generate three or more different voltage levels upon the transmission line dependent upon the binary data. The resulting increase in data transmission capability may be used to reduce the total number of transmission lines coupled between the first and second communication devices, or to increase the rate at which the binary data is transmitted from the first communication device to the second communication device.

In a first embodiment of the digital communication system, the first communication device has an output node coupled to a first end of a transmission line, and the second communication device has an input node coupled to a second end of the transmission line. The second communication device includes a termination resistor coupled between the input node and a power supply voltage level (e.g., $V_{DD}$). The second communication device may be configured such that an electrical voltage level existing at the input node is substantially dependent upon an amount of electrical current flowing through the termination resistor. The termination resistor may have a value substantially equal to a characteristic impedance of the transmission line such that signal reflections and distortion occurring within the transmission line are substantially reduced.

The first communication device drives the output node in one of p drive states, where p≧3. Each of the p drive states causes a different amount of electrical current to flow through the termination resistor such that a different electrical voltage level exists at the input node in each of the p drive states. The different electrical voltage levels existing at the input node in each of the p drive states may differ by substantially equal amounts, and may be associated with different logic levels. The three or more logic levels represent an increase in data transmission capability over the two logic levels used in binary data transmission.

The first communication device may include an output section receiving binary data and driving the output node in one of the p drive states dependent upon the binary data. The output section may also receive a first clock signal, and may drive the output node in response to the first clock signal. The second communication device may include an input section coupled to the input node and configured to produce the binary data from the different electrical voltage levels existing at the input node. The input section may produce the binary data in response to a second clock signal. The first and second clock signals may be synchronized in one of several possible ways in order to achieve synchronous data transmission. For example, the first communication device may provide the first clock signal to the second communication device via a dedicated clock transmission line. Alternately, the second communication device may generate the second clock signal in synchronization with voltage level transitions present upon the transmission line conveying data.

In a second embodiment of the digital communication system, the second communication device may include two termination resistors: a first termination resistor coupled between the input node and the first power supply voltage level (e.g., $V_{DD}$), and a second termination resistor coupled between the input node and a second power supply voltage level (e.g., $V_{SS}$). The second communication device may be configured such that an electrical voltage level existing at the input node is substantially dependent upon an amount of electrical current flowing through the first termination resistor. The first and second termination resistors may have values substantially equal to twice the characteristic impedance of the transmission line such that the transmission line is terminated in the characteristic impedance of the transmission line, and signal reflections and distortion occurring within the transmission line are substantially reduced.

The first communication device may include drive circuitry within the output section. The output section may electrically couple the drive circuitry to the output node inp drive states, where p≧2, and drive the output node in the p drive states via the drive circuitry. The output section may not drive the output node in an additional "non-drive" state. In the non-drive state, the output section may electrically decouple the drive circuitry from the output node. In each of the p drive states and the non-drive state, a different amount of electrical current may flow through the first termination resistor such that a different electrical voltage level exists at the input node. The different electrical voltage levels existing at the input node in each of the p drive states and the non-drive state may differ by substantially equal amounts and may be associated with different logic levels.

In the second embodiment, the drive circuitry may drive the output node in one of the p drive states dependent upon the binary data and in response to the first clock signal. The output section may also electrically decouple the drive circuitry from the output node in the non-drive state dependent upon the binary data and in response to the first clock signal. As described above, the second communication device may include an input section coupled to the input node and configured to produce the binary data from the different electrical voltage levels existing at the input node. The input section may produce the binary data in response to a second clock signal. The first and second clock signals may be synchronized as described above in order to achieve synchronous data transmission.

In a third embodiment of the digital communication system, the first communication device has m data output nodes and a clock output node. The second communication device has m data input nodes corresponding to the m data output nodes, and a clock input node corresponding to the clock output node. In the third embodiment, the digital communication system includes m data transmission lines coupled between the corresponding m data output nodes and m data input nodes, and a clock transmission line coupled between the clock output and input nodes.

The second communication device includes an input section having m+1 termination resistors. Each of m of the termination resistors is coupled between a different one of the m data input nodes and a power supply voltage level (e.g., $V_{DD}$), and the remaining termination resistor is coupled between the clock input node and the power supply voltage level. The second communication device may be configured such that: (i) an electrical voltage level existing at a given data input node is substantially dependent upon an amount of electrical current flowing through the termination resistor coupled between the given data input node and the power supply voltage level, and (ii) an electrical voltage level existing at the clock input node is substantially dependent upon an amount of electrical current flowing through the termination resistor coupled between the clock input node and the power supply voltage level. Each termination resistor may have a value substantially equal to a characteristic impedance of a corresponding transmission line such that signal reflections and distortion occurring within the corresponding transmission line are substantially reduced.

In the third embodiment, the first communication device includes an output section coupled to receive n binary data signals and a binary clock signal. The output section drives each of the m data output nodes in one of p drive states dependent upon the n binary data signals and in response to the binary clock signal, where n>m and p≧3. Each of the p drive states used to drive a given data output node causes a different amount of electrical current to flow through the termination resistor coupled to the corresponding data input node such that a different electrical voltage level exists at the corresponding data input node in each of the p drive states. The different electrical voltage levels existing at the corresponding input node in each of the p drive states may differ by substantially equal amounts and may be associated with different logic levels.

The output section also drives the clock output node in one of q drive states dependent upon the binary clock signal, where q≧2. Each of the q drive states causes a different amount of electrical current to flow through the termination resistor coupled to the clock input node such that a different electrical voltage level exists at the clock input node in each of the q drive states. The different electrical voltage levels existing at the clock input node in each of the q drive states may be associated with different logic levels.

The input section is configured to: (i) produce the binary clock signal from the electrical voltage levels existing at the clock input node, and (ii) produce the n binary data signals from the electrical voltage levels existing at the m data input nodes in response to the binary clock signal.

The n binary data signals simultaneously convey one of $2^n$ logical states. The m data transmission lines having one of p voltage levels present thereupon simultaneously convey one of $p^m$ logical states. Thus the minimum value of m for simultaneous conveyance of the one of $2^n$ logical states is the smallest integer greater than or equal to $\log_p(2^n)$. For example, n and p may both equal 3. In this case, $\log_3(2^3)$ is approximately 1.89, and the minimum value of m for simultaneous conveyance of one of $2^3$ (8) logical states is 2, the smallest integer greater than or equal to 1.89.

In a fourth embodiment of the digital communication system, the first communication device again has m data output nodes and a clock output node, and the second communication device has m data input nodes corresponding to the m data output nodes and a clock input node corresponding to the clock output node. A total of m data transmission lines are coupled between corresponding data input and output nodes, and a clock transmission line is coupled between the clock input node and the clock output node.

In the fourth embodiment, the second communication device includes an input section having; (i) a first m termination resistors each coupled between a different one of the m data input nodes and a first power supply voltage level (e.g., $V_{DD}$), (ii) a second m termination resistors each coupled between a different one of the m data input nodes and a second power supply voltage level (e.g., $V_{SS}$), and (iii) a termination resistor coupled between the clock input node and the first power supply voltage level. The second communication device may be configured such that: (i) an electrical voltage level existing at a given data input node is substantially dependent upon an amount of electrical current flowing through the termination resistor coupled between the given data input node and the first power supply voltage level, and (ii) an electrical voltage level existing at the clock input node is substantially dependent upon an amount of electrical current flowing through the termination resistor coupled between the clock input node and the first power supply voltage level. Each of the two termination resistors coupled to a given data input node may have a value substantially equal to twice a characteristic impedance of a data transmission line coupled to the input node such that the data transmission line is terminated in its characteristic impedance. As a result, signal reflections and distortion occurring within the m data transmission lines are substantially reduced.

As in the third embodiment, the first communication device includes an output section coupled to receive n binary data signals and a binary clock signal. In the fourth embodiment, the output section may drive each of the m data output nodes in one of p drive states, where n>m and p≧2. The first communication device may include drive circuitry within the output section connected to each of the m data output nodes in each of the p drive states dependent upon the binary data and in response to the first clock signal. The output section may not drive a given data output node in an additional "non-drive" state. In the non-drive state, the output section may electrically decouple the drive circuitry from the given data output node dependent upon the binary data and in response to the first clock signal. In each of the p drive states and the non-drive state, a different amount of electrical current may flow through the two termination resistors coupled to the data input node corresponding to a given data output node such that a different electrical voltage level exists at the data input node. The different electrical voltage levels existing at the data input node in each of the p drive states and the non-drive state may differ by substantially equal amounts and may be associated with different logic levels.

The output section also drives the clock output node in one of q drive states dependent upon the binary clock signal, where $q \geq 1$. When $q=1$, an additional termination resistor may be coupled between the clock input node and the second power supply voltage level, and the output section may electrically decouple drive circuitry from the clock output node in an additional "non-drive" state as described above. The values of the one or more termination resistors coupled to the clock input node may be selected such that the input resistance at the clock input node is substantially equal to the characteristic impedance of the clock transmission line. In this case, signal reflections and distortion occurring within the clock transmission line are substantially reduced. Each of the q drive states causes a different amount of electrical current to flow through the termination resistor coupled to the clock input node such that a different electrical voltage level exists at the clock input node in each of the q drive states.

As in the third embodiment, the input section is configured to: (i) produce the binary clock signal from the electrical voltage levels existing at the clock input node, and ii) produce the n binary data signals from the electrical voltage levels existing at the m data input nodes in response to the binary clock signal.

The structures of the first and second embodiments described above may be used to implement a data transmission scheme which facilitates the generation of the second clock signal within the second communication device and the synchronization of the second clock signal to the first clock signal. A ternary data stream including ternary data is produced upon the transmission line as described above, wherein a voltage level transition occurs within the ternary data stream every cycle of the first clock signal. The first communication device may generate the ternary data in a manner which guarantees a voltage level transition upon the transmission line for every cycle of the first clock signal even when the logic levels of the binary data remain unchanged from one cycle of the first clock signal to the next. The second communication device may reproduce the binary data from the ternary signals of the ternary data stream received via the transmission line.

In a method for implementing the above data transmission scheme, control logic within an output section of the first communication device may encode the binary data to form the ternary data stream. The second communication device may receive the ternary data stream and synchronize the second clock signal to the first clock signal using the voltage level transitions occurring within the ternary data stream. Circuitry within an input section of the second communication device may be used to decode the ternary data within the ternary data stream in response to the second clock signal thereby reproducing the binary data from the ternary data signals.

It is noted that the data transmission scheme described above eliminates the need for a separate clock transmission line to convey the first clock signal from the first communication device to the second communication device. It is noted that the ternary signals produced using the data transmission scheme may be used to encode the first clock signal with binary data upon multiple transmission lines coupled between the first communication device and the second communication device such that reception of the first clock signal by the second communication device is ensured even in case of transmission line failure.

BRIEF DESCRIPTION OF THE DRAWINGS

Other objects and advantages of the invention will become apparent upon reading the following detailed description and upon reference to the accompanying drawings in which.

Figure 1:
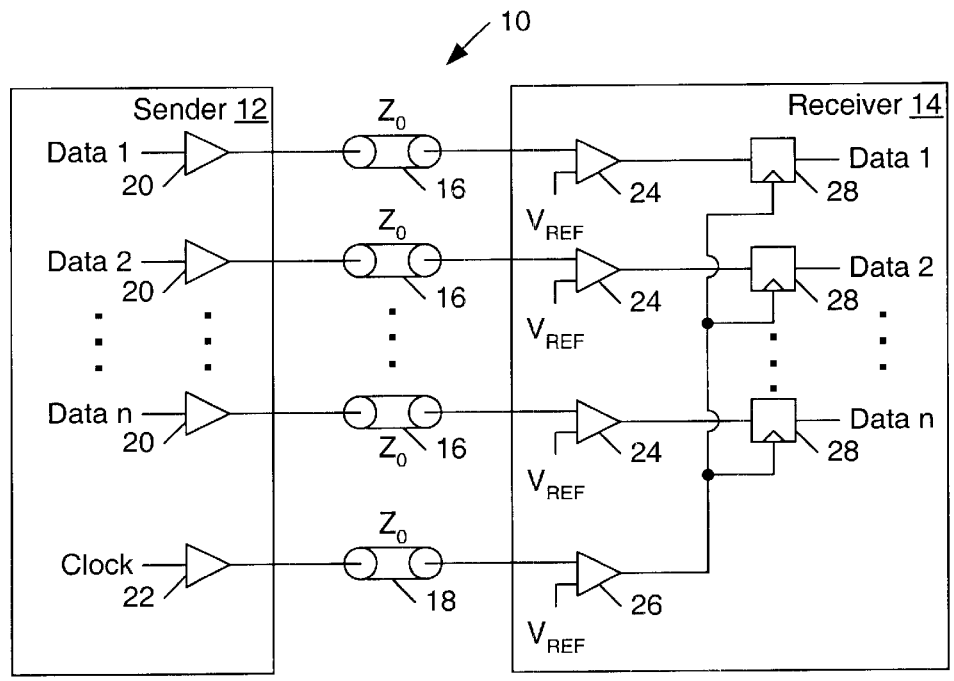
FIG. 1 is a diagram of a digital communication system employing source-synchronous data transmission, wherein the communication system includes a sender and a receiver coupled to opposite ends of n data transmission lines, and wherein n binary data signals are conveyed simultaneously from the sender to the receiver via the n data transmission lines, and wherein the receiver produces the n binary data signals in response to a clock signal conveyed from the sender to the receiver via a dedicated clock transmission line.
Figure 2:
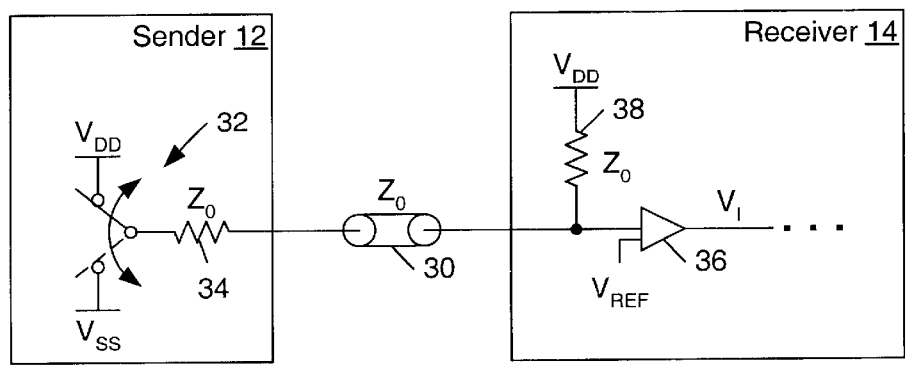
FIG. 2 is a diagram of a representative one of the transmission lines of FIG. 1, wherein resistive terminations are employed at both ends of the representative transmission line in order to reduce signal reflections and distortion.
Figure 3:
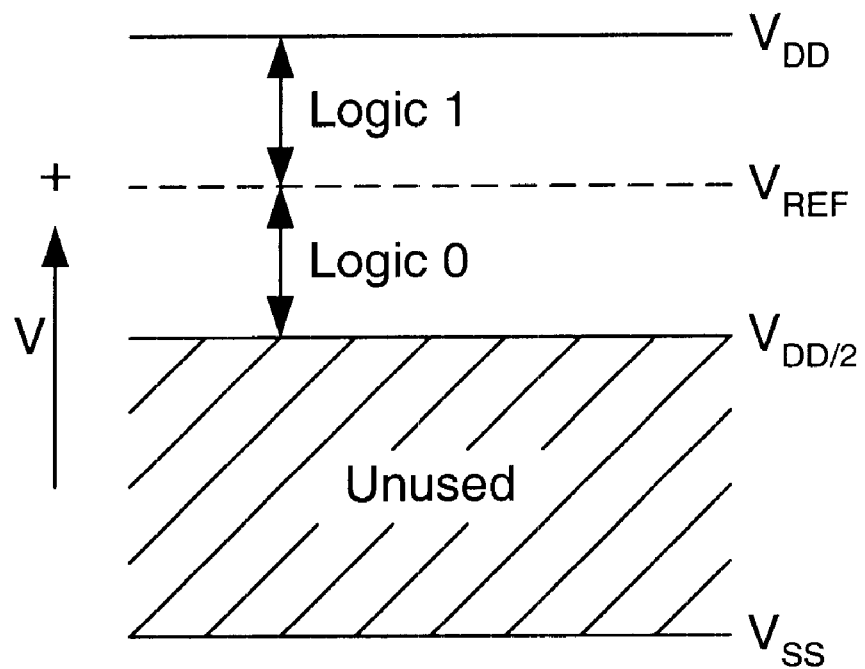
FIG. 3 is a graph of voltage levels present within the sender and upon the representative transmission line illustrated in FIG. 2.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 4:
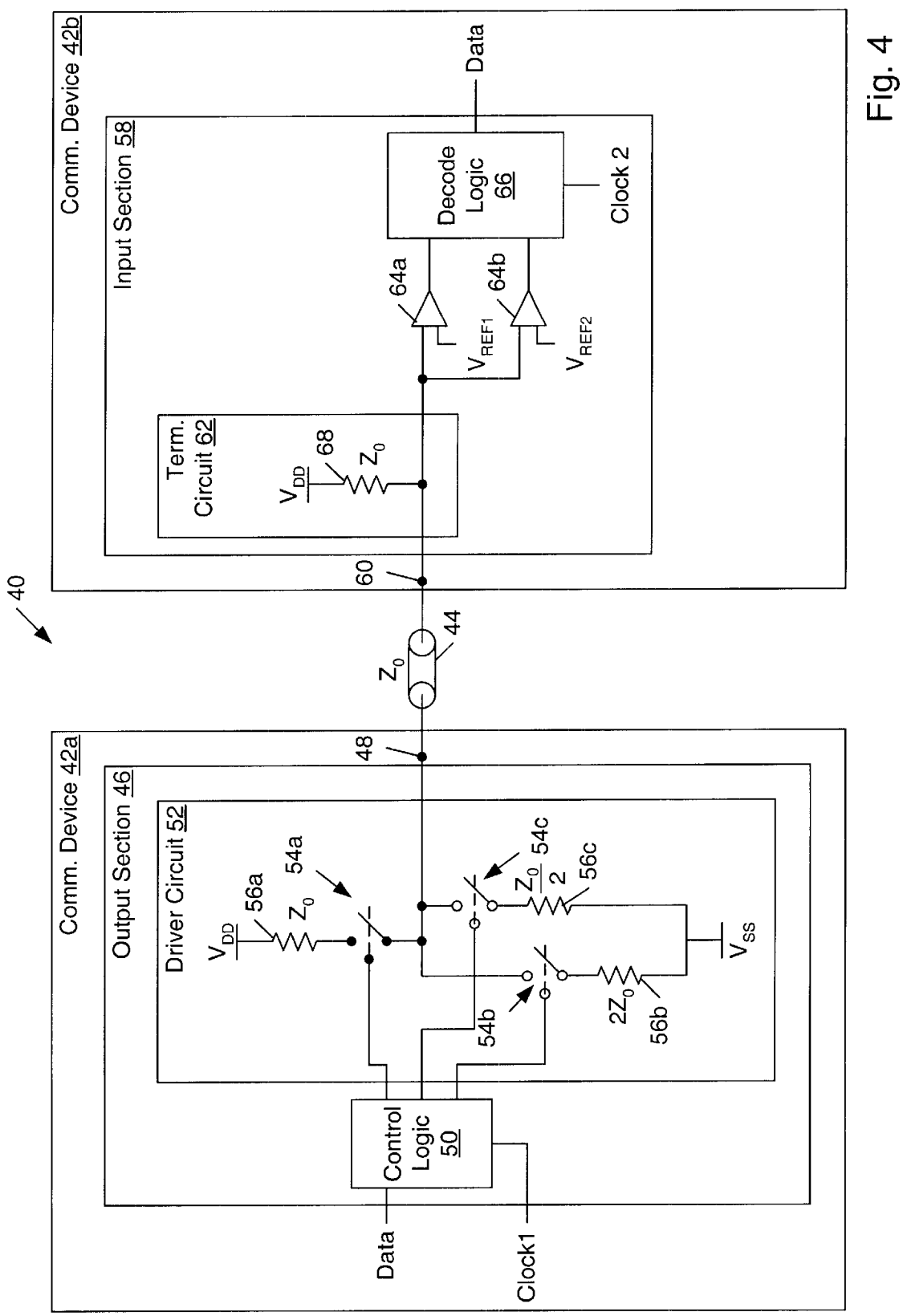
FIG. 4 is a diagram of one embodiment of a first digital communication system in accordance with the present invention, wherein the first digital communication system includes a first communication device and a second communication device coupled to opposite ends of a transmission line.

FIG. 4 is a diagram of one embodiment of a digital communication system 40 in accordance with the present invention. Digital communication system 40 includes a first communication device 42a and a second communication device 42b coupled to opposite ends of a transmission line 44. Communication device 42a drives one of three different voltage levels upon a first end of transmission line 44 dependent upon multiple binary data signals. Communication device 42b is coupled to a second end of transmission line 44. Communication device 42b receives the voltage levels driven upon transmission line 44 and reproduces the original multiple binary data signals from the voltage levels.

Transmission line 44 may be a signal line which behaves like a transmission line due to the fact that transition times (i.e., signal rise or fall times) between voltage levels driven upon transmission line 44 are short with respect to the propagation delay time of the signal line as described above. For example, transmission line 44 may be a signal line having a propagation delay time greater than about one-quarter of any transition time between voltage levels.

Communication device 42a includes an output section 46 coupled to an output node 48. Output node 48 is coupled to the first end of transmission line 44. Output section 46 includes control logic 50 and a driver circuit 52. Driver circuit 52 is coupled between control logic 50 and output node 48. Control logic 50 receives binary data signals DATA and a binary clock signal CLOCK1, and produces control signals coupled to driver circuit 52 dependent upon the binary data signals DATA and in response to the binary clock signal CLOCK1.

In the embodiment of FIG. 4, driver circuit 52 includes three switching elements 54a–c. Each switching element 54 includes two switch terminals and a control terminal. Each switching element 54 receives a different control signal from control logic 50 at the control terminal, and is either in an open state or a closed state dependent upon the received control signal. In the open state, a given switching element 54 offers a relatively high electrical resistance between the switch terminals. In the closed state, the given switching element 54 offers a relatively low electrical resistance between the switch terminals. Switching elements 54a–c may be, for example, metal oxide semiconductor (MOS) transistors.

One switch terminal of each switching element 54 is coupled to output node 48. The second switch terminal of switching element 54a is coupled to one terminal of a resistor 56a. A second terminal of resistor 56a is coupled to a first power supply voltage level $V_{DD}$. Switching element 54a connects output node 48 to $V_{DD}$ through resistor 56a in response to the control signal received from control logic 50.

The second switch terminals of switching elements 54b are coupled to one terminal of respective resistors 56b and 56c, and second terminals of resistors 56b and 56c are coupled to a second power supply voltage level $V_{SS}$. Hereinbelow, second power supply voltage level will be regarded as a reference ground electrical potential, and first power supply voltage level $V_{DD}$ is referenced to $V_{SS}$. Switching element 54b connects output node 48 to $V_{SS}$ through resistor 56b in response to the control signal received from control logic 50, and switching element 54c connects output node 48 to $V_{SS}$ through resistor 56c in response to the control signal received from control logic 50.

Communication device 42b includes an input section 58 coupled to an input node 60. Input node 60 is coupled to the second end of transmission line 44. Input section 58 includes a termination circuit 62, two comparators 64a–b, and decode logic 66. Termination circuit 62 includes a termination resistor 68 having a value substantially equal to a characteristic impedance $Z_O$ of transmission line 44. One terminal of termination resistor 68 is coupled to input node 60, and the other terminal of resistor 68 is coupled to $V_{DD}$. Comparators 64a–b each have two input terminals and an output terminal. A first input terminal of comparator 64a is coupled to input node 60, and the second input terminal is coupled to a first reference voltage level $V_{REF1}$. A first input terminal of comparator 64b is coupled to input node 60, and the second input terminal is coupled to a second reference voltage level $V_{REF2}$. The output terminals of comparators 64a–b are coupled to decode logic 66. Decode logic 66 also receives a binary clock signal CLOCK2. Decode logic 66 reproduces binary data signals DATA using binary output signals produced by comparators 64a–b and in response to clock signal CLOCK2. Clock signal CLOCK2 may be generated within input section 58 and synchronized to clock signal CLOCK1, or may be a copy of clock signal CLOCK1 provided to input section 58 by communication device 42a.

Driver circuit 52 drives output node 48 in one of three drive states dependent upon data signals DATA. In each drive state, one of the switching elements 54a–c is in the closed state. In a first drive state, switching element 54a is in the closed state, and switching elements 54b and 54c are in the open state. Output node 48 is coupled to $V_{DD}$ through switching element 54a and resistor 56a. Resistor 56a has a value substantially equal to characteristic impedance $Z_O$ of transmission line 44. In the first drive state, no electrical current flows through termination resistor 68, and input node 60 is at a voltage level of $V_{DD}$.

In a second drive state, switching element 54b is in the closed state, and switching elements 54a and 54c are in the open state. Output node 48 is coupled to $V_{SS}$ through switching element 54b and resistor 56b. Resistor 56b has a value substantially equal to twice the characteristic impedance $Z_O$ of transmission line 44. Termination resistor 68 and resistor 56b are connected in series between $V_{DD}$ and $V_{SS}$, forming a voltage divider network. In the second drive state, an electrical current of about $(V_{DD}/3 \cdot Z_O)$ flows through termination resistor 68, and input node 60 is at a voltage level of approximately $(2 \cdot V_{DD}/3)$.

In the third drive state, switching element 54c is in the closed state, and switching elements 54a and 54b are in the open state. Output node 48 is coupled to $V_{SS}$ through switching element 54c and resistor 56c. Resistor 56c has a value substantially equal to half the characteristic impedance $Z_O$ of transmission line 44. Termination resistor 68 and resistor 56c are connected in series between $V_{DD}$ and $V_{SS}$, forming a voltage divider network. In the third drive state, an electrical current of about $(2 \cdot V_{DD}/3 \cdot Z_O)$ flows through termination resistor 68, and input node 60 is at a voltage level of $(V_{DD}/3)$.

Figure 5:
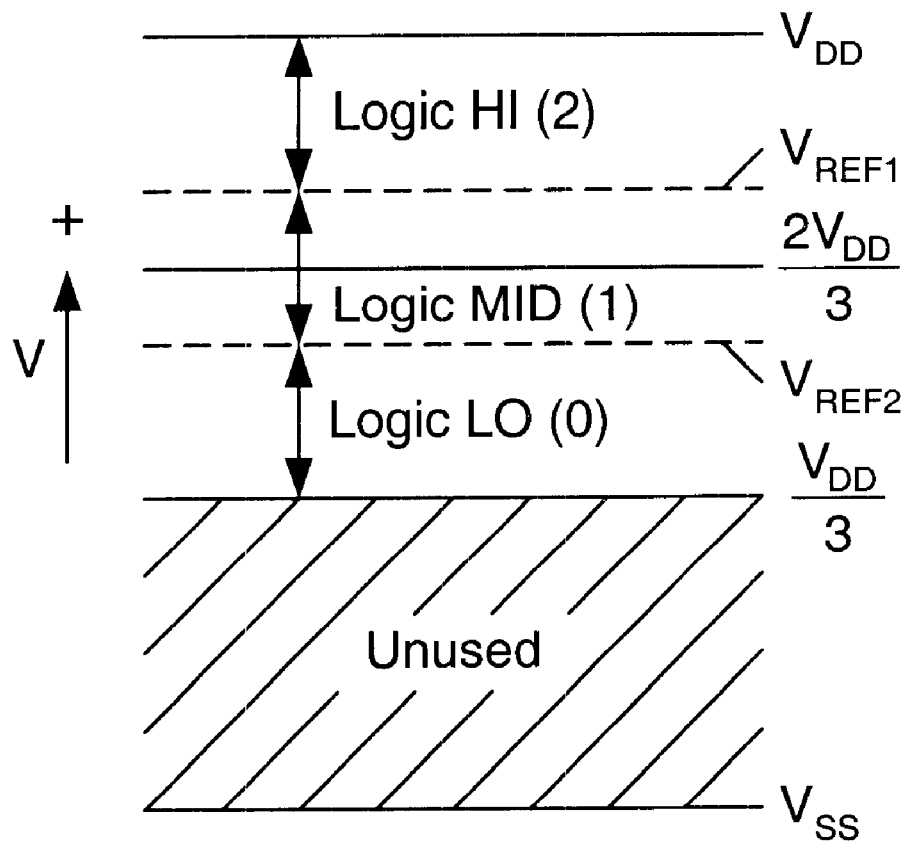
FIG. 5 is a graph of voltage levels present within the first communication device and driven upon the transmission line of FIG. 4.

FIG. 5 is a graph of voltage levels V present within communication device 42a and driven upon transmission line 44 of FIG. 4. In the first, second, and third drive states of driver circuit 52, respective approximate voltage levels of $V_{DD}$, $(2 \cdot V_{DD}/3)$, and $(V_{DD}/3)$ are driven upon transmission line 44 by driver circuit 52 as described above. The three voltage levels associated with the three drive states are used to convey binary data signals DATA from communication device 42a to communication device 42b. A lower third of the voltage range below $(V_{DD}/3)$ is unused.

First reference voltage level $V_{REF1}$ is selected between voltage levels $V_{DD}$ and $(2 \cdot V_{DD}/3)$ as indicated in FIG. 5.

Voltage values less than $V_{REF1}$ received at the first input terminal of comparator 64a may cause comparator 64a to produce a binary logic 0 signal at the output terminal, and voltage values greater then $V_{REF1}$ received at the first input terminal of comparator 64a may cause comparator 64a to produce a binary logic 1 signal at the output terminal.

Second voltage level $V_{REF2}$ is selected between voltage levels $V_{DD}/3$ and $(2 \cdot V_{DD}/3)$, as indicated in FIG. 5. Voltage values less than $V_{REF2}$ received at the first input terminal of comparator 64b may cause comparator 64b to produce a binary logic 0 signal at the output terminal, and voltage values greater then $V_{REF2}$ received at the first input terminal of comparator 64b may cause comparator 64b to produce a binary logic 1 signal at the output terminal.

The two binary outputs of comparators 64a–b indicate which of the three voltage levels exists upon transmission line 44. For example, when the first voltage level of $V_{DD}$ is present upon transmission line 44, the outputs of comparators 64a–b may both be a binary logic 1. When the second voltage level of $(2 \cdot V_{DD}/3)$ is present upon transmission line 44, the output of comparator 64a may be a binary logic 0, and the output of comparator 64b may be a binary logic 1. When the third voltage level of $(V_{DD}/3)$ is present upon transmission line 44, the outputs of comparators 64a–b may both be a binary logic 0.

As described above, decode logic 66 uses the binary outputs of comparators 64a–b to reproduce binary data signals DATA. The values of three binary data signals DATA convey one of $2^3$ (8) logical states. Two successive voltage levels driven upon transmission line 44 carry $3^2$ or 9 logical states. Thus three binary data signals DATA may be conveyed using two successive voltage levels driven upon transmission line 44. This reduction in the number of voltage levels which must be driven upon transmission line 44 in order to convey a certain quantity of information may be used to increase the rate at which data is transmitted from communication device 42a to communication device 42b, or to reduce a required number of transmission lines connected between communication device 42a and 42b while maintaining a given data transmission rate.

Figure 6:
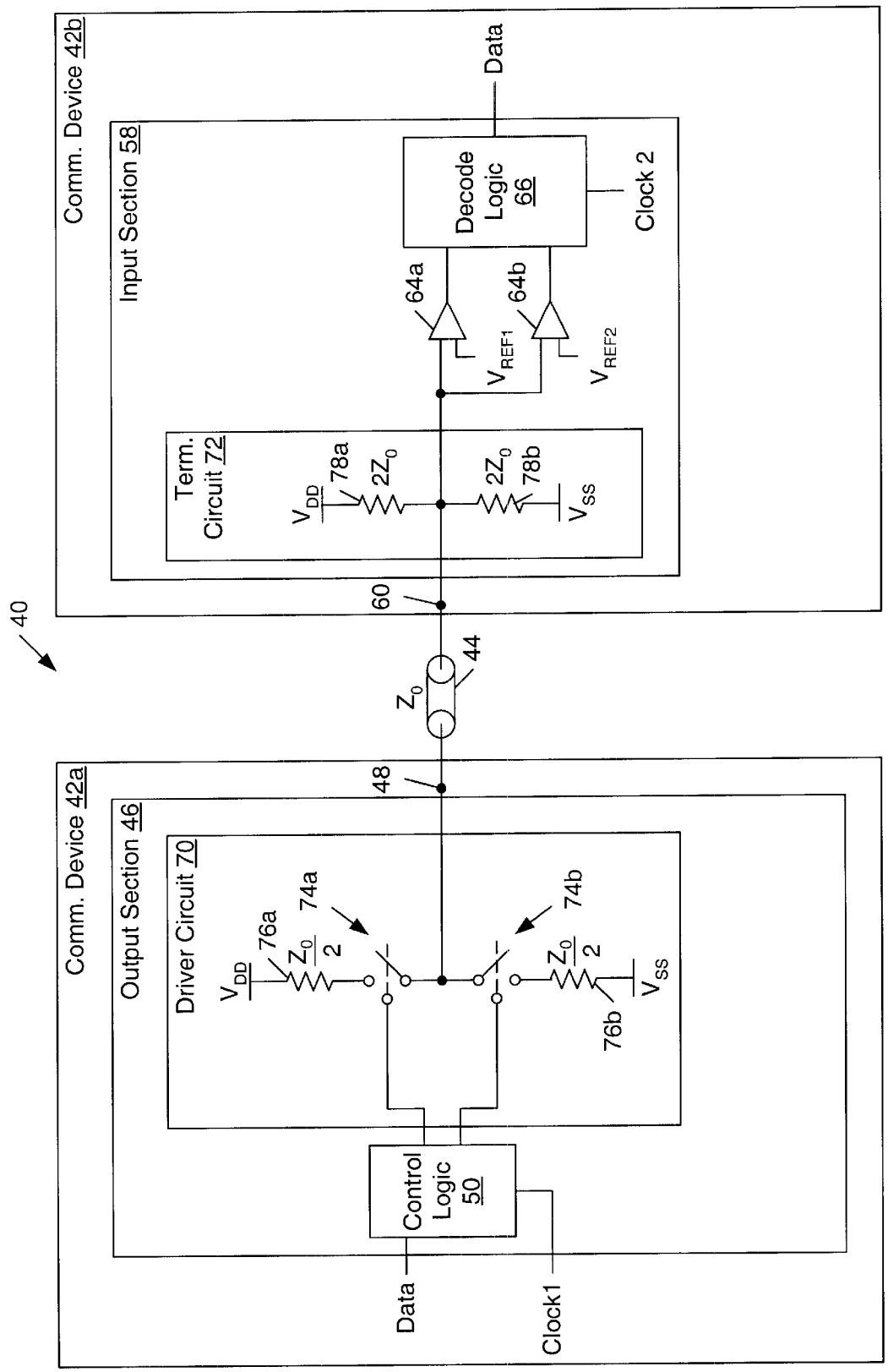
FIG. 6 is a diagram of an alternate embodiment of the first digital communication system of FIG. 4.

FIG. 6 is a diagram of an alternate embodiment of digital communication system 40 in accordance with the present invention. In the embodiment of FIG. 6, output section 46 of first communication device 42a includes a driver section 70 coupled between control logic 50 and output node 48, and input section 58 of second communication device 42b includes a termination circuit 72 coupled between input node 60 and comparators 64a–b.

Driver circuit 70 includes two switching elements 74a–b. Each switching element 74 includes two switch terminals and a control terminal. Each switching element 74 receives a different control signal from control logic 50 at the control terminal, and is either in an open state or a closed state dependent upon the received control signal. In the open state, a given switching element 74 offers a relatively high electrical resistance between the switch terminals. In the closed state, the given switching element 74 offers a relatively low electrical resistance between the switch terminals. Switching elements 74a–b may be, for example, metal oxide semiconductor (MOS) transistors.

One switch terminal of each switching element 74 is coupled to output node 48. The second switch terminal of switching element 74a is coupled to one terminal of a resistor 76a. A second terminal of resistor 76a is coupled to first power supply voltage level $V_{DD}$. Switching element 74a connects output node 48 to $V_{DD}$ through resistor 76a in response to the control signal received from control logic 50.

The second switch terminal of switching element 74b is coupled to one terminal of a resistor 76b, and the second terminal of resistor 76b is coupled to second power supply voltage level $V_{SS}$. Switching element 74b connects output node 48 to $V_{SS}$ through resistor 76b in response to the control signal received from control logic 50.

Termination circuit 72 includes two termination resistors: a first termination resistor 78a and a second termination resistor 78b, each having a value substantially equal to twice the characteristic impedance $Z_O$ of transmission line 44. One terminal of first and second termination resistors 78a–b are coupled to input node 60. A second terminal of termination resistor 78a is coupled to $V_{DD}$, and a second terminal of termination resistor 78b is coupled to $V_{SS}$.

Driver circuit 70 drives output node 48 in one of two drive states, and does not drive output node 48 in a third "non-drive" state, dependent upon data signals DATA. In each of the two drive states, one of the switching elements 74a–b is in the closed state. In a first drive state, switching element 74a is in the closed state, and switching element 74b is in the open state. Output node 48 is coupled to $V_{DD}$ through switching element 74a and resistor 76a. Resistor 76a has a value substantially equal to half the characteristic impedance $Z_O$ of transmission line 44. In the first drive state, an electrical current of about $(V_{DD}/12 \cdot Z_O)$ flows through first termination resistor 78a, an electrical current of about $(5 \cdot V_{DD}/12 \cdot Z_O)$ flows through second termination resistor 78b, and input node 60 is at a voltage level of $(5 \cdot V_{DD}/6)$.

In the second drive state, switching element 74b is in the closed state and switching element 74a is in the open state. Output node 48 is coupled to $V_{SS}$ through switching element 74b and resistor 76b. Resistor 76b has a value substantially equal to half the characteristic impedance $Z_O$ of transmission line 44. In the second drive state, an electrical current of about $(5 \cdot V_{DD}/12 \cdot Z_O)$ flows through first termination resistor 78a, an electrical current of about $(V_{DD}/12 \cdot Z_O)$ flows through second termination resistor 78b, and input node 60 is at a voltage level of $(V_{DD}/6)$.

In the third "non-drive" state, switching elements 74a–b are both in the open state, and driver circuit 70 does not drive output node 48. Input node 60 is coupled to $V_{DD}$ through first termination resistor 78a, and to $V_{SS}$ through second termination resistor 78b. First and second termination resistors 78a–b both have values substantially equal to twice the characteristic impedance $Z_O$ of transmission line 44. In the third "non-drive" state, an electrical current of about $(V_{DD}/4 \cdot Z_O)$ flows through first and second termination resistors 78a–b, and input node 60 is at a voltage level of $(V_{DD}/2)$.

Figure 7:
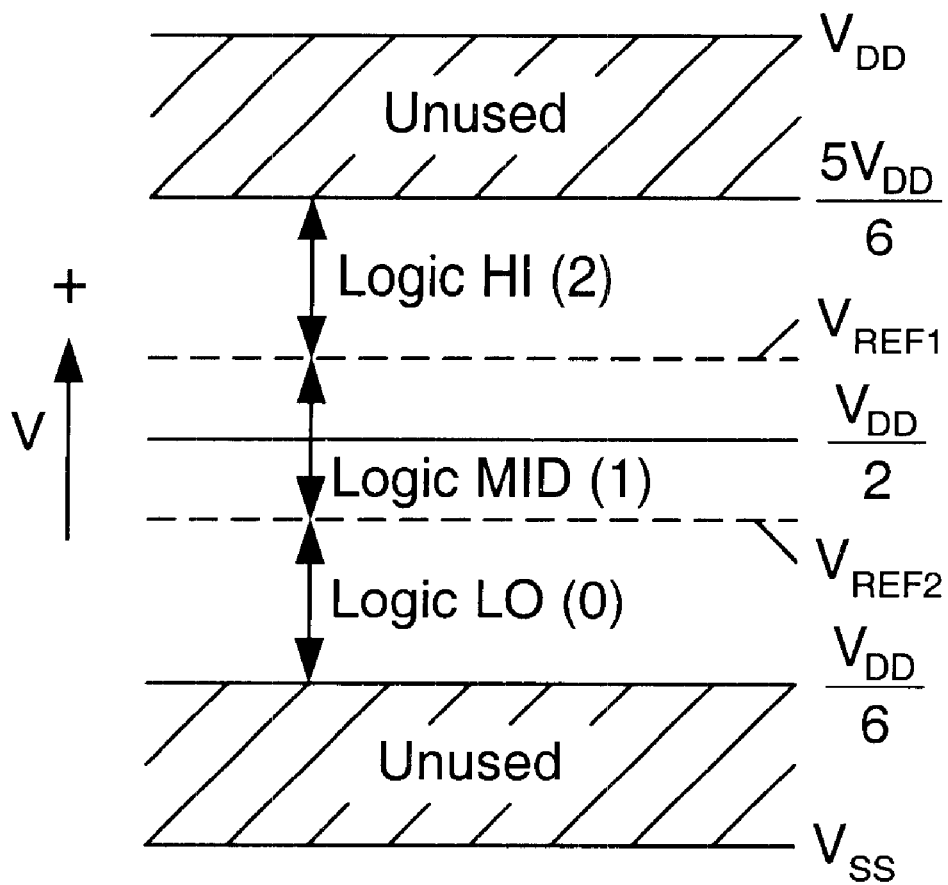
FIG. 7 is a graph of voltage levels present within the first communication device and driven upon the transmission line of FIG. 6.

FIG. 7 is a graph of voltage levels V present within communication device 42a and present upon transmission line 44 of FIG. 6. In the first and second drive states of driver circuit 70, respective approximate voltage levels of $(5 \cdot V_{DD}/6)$ and $(V_{DD}/6)$ are driven upon transmission line 44 by driver circuit 70 as described above. In the third "non-drive" state of driver circuit 70, first and second termination resistors 78a–b of termination circuit 72 force a voltage level of $(V_{DD}/2)$ upon transmission line 44 as described above. The three voltage levels associated with the two drive states and the non-drive state are used to convey binary data signals DATA from communication device 42a to communication device 42b. Upper and lower one-sixths of the voltage range between $V_{DD}$ and $V_{SS}$ are unused as shown in FIG. 7.

First reference voltage level $V_{REF1}$ provided to the second input terminal of comparator 64a is selected between voltage levels $(5 \cdot V_{DD}/6)$ and $(V_{DD}/2)$ as indicated in FIG. 7.

Voltage values less than $V_{REF1}$ received at the first input terminal of comparator 64a may cause comparator 64a to produce a binary logic 0 signal at the output terminal, and voltage values greater then $V_{REF1}$ received at the first input terminal of comparator 64a may cause comparator 64a to produce a binary logic 1 signal at the output terminal.

Second voltage level $V_{REF2}$ provided to the second input terminal of comparator 64b is selected between voltage levels ($V_{DD}/2$) and ($V_{DD}/6$) as indicated in FIG. 7. Voltage values less than $V_{REF2}$ received at the first input terminal of comparator 64b may cause comparator 64b to produce a binary logic 0 signal at the output terminal, and voltage values greater then $V_{REF2}$ received at the first input terminal of comparator 64b may cause comparator 64b to produce a binary logic 1 signal at the output terminal.

As described above, the binary outputs of comparators 64a–b indicate which of the three voltage levels exists upon transmission line 44. For example, when the first voltage level of ($5 \cdot V_{DD}/6$) is present upon transmission line 44, the outputs of comparators 64a–b may both be a binary logic 1. When the second voltage level of ($V_{DD}/2$) is present upon transmission line 44, the output of comparator 64a may be a binary logic 0, and the output of comparator 64b may be a binary logic 1. When the third voltage level of ($V_{DD}/6$) is present upon transmission line 44, the outputs of comparators 64a–b may both be a binary logic 0. Decode logic 66 uses the binary outputs of comparators 64a–b to reproduce binary data signals DATA as described above.

Figure 8:
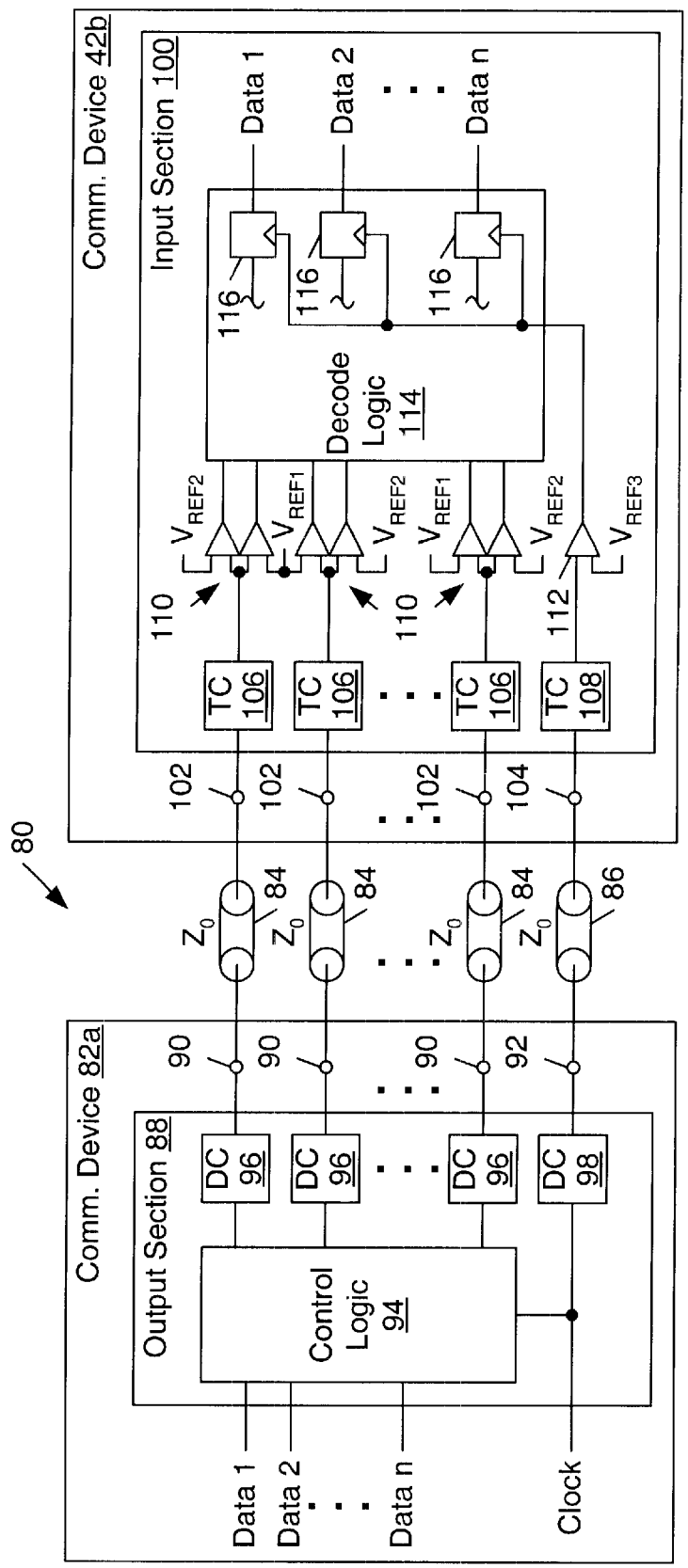
FIG. 8 is a diagram of one embodiment of a second digital communication system in accordance with the present invention.

FIG. 8 is a diagram of one embodiment of a digital communication system 80 in accordance with the present invention. Digital communication system 80 includes a first communication device 82a and a second communication device 82b coupled to opposite ends of m data transmission lines 84 (m≧2) and a clock transmission line 86. Communication device 82a drives one of three different voltage levels upon first ends of the m data transmission lines 84 dependent upon the logical values of n binary data signals DATA1 through DATAn (n≧2) and in response to a clock signal CLOCK. Communication device 82a also drives at least one voltage level upon a first end of clock transmission line 86 in response to clock signal CLOCK. Communication device 82b is coupled to second ends of the m data transmission lines 84 and clock transmission line 86. The m data transmission lines 84 and clock transmission line 86 may be signal lines which behave like transmission line due to the fact that signal rise and fall times between voltage levels are short with respect to propagation delay times of the signal lines as described above.

Communication device 82b receives the voltage levels driven upon the m data transmission lines 84 and clock transmission line 86. Communication device 82b reproduces the original clock signal CLOCK from the at least one voltage level driven upon clock transmission line 86. Communication device 82b reproduces the original n binary data signals DATA1 through DATAn from the voltage levels driven upon the m data transmission lines 84 and in response to clock signal CLOCK.

Communication device 82a includes an output section 88 coupled to m data output nodes 90 and a clock output node 92. Each of the m data output nodes 90 is coupled to the first end of a different data transmission line 84, and clock output node 92 is coupled to the first end of clock transmission line 86. Output section 88 includes control logic 94, m driver circuits (DC) 96 each coupled to a corresponding one of the m data output nodes 90, and a driver circuit (DC) 98 coupled to clock output node 92.

Each of the m driver circuits 96 is coupled between control logic 94 and the corresponding one of the m data output nodes 90. Control logic 94 receives the n binary data signals DATA1 through DATAn and a binary clock signal CLOCK. Control logic 94 produces control signals coupled to the m driver circuits 96. Control logic 94 produces the control signals dependent upon the n binary data signals DATA1 through DATAn and in response to the binary clock signal CLOCK.

Each of the m driver circuits 96 may be driver circuit 52 or driver circuit 70 described above. Each of the m driver circuits 96 may drive the corresponding one of the m output nodes 90 in one of three drive states dependent upon the control signals received from control logic 94 (driver circuit 52). Alternately, each of the m driver circuits may drive the corresponding one of the m output nodes 90 in one of two drive states, and may not drive the corresponding one of the m output nodes 90 in a third "non-drive" state, dependent upon the control signals received from control logic 94 (driver circuit 70).

Communication device 42b includes an input section 100 coupled to m data input nodes 102 and a clock input node 104. Each of the m data input nodes 102 is coupled to the second end of a corresponding one of the m data transmission lines 84, and clock input node 104 is coupled to the second end of clock transmission line 86. Input section 100 includes m termination circuits 106 each coupled to a corresponding one of the m data input nodes 102, a termination circuit 108 coupled to clock input node 104, m pairs of comparators 110, a comparator 112, and decode logic 114.

Each of the m termination circuits 106 within communication device 82b corresponds to a different one of the m driver circuits within communication device 82a just as termination circuit 108 corresponds to driver circuit 98. Each of the m termination circuits 106 and termination circuit 108 may be termination circuit 62 or termination circuit 72 dependent upon whether the corresponding driver circuit is a driver circuit 52 or driver circuit 70. A given one of the m termination circuits 106 may be termination circuit 62 when the corresponding one of the m driver circuits 96 is driver circuit 52, and termination circuit 108 may be termination circuit 62 when driver circuit 98 is driver circuit 52. Similarly, the given one of the m termination circuits 106 may be termination circuit 72 when the corresponding one of the m driver circuits 96 is driver circuit 70, and termination circuit 108 may be termination circuit 72 when driver circuit 98 is driver circuit 70.

Each comparator of the m pairs of comparators 110 has two input terminals and an output terminal. A first input terminal of each comparator of the m pairs of comparators 110 is coupled to a corresponding one of the m data input nodes 102 through a corresponding one of the m termination circuits 106. The second input terminal of a first comparator of each of the m pairs of comparators 110 is coupled to first reference voltage level $V_{REF1}$. The second input terminal of a second comparator of each of the m pairs of comparators 110 is coupled to second reference voltage level $V_{REF2}$. Each of the m pairs of comparators 110 produce binary logic signals at the output terminals which indicate which of three voltage levels are present upon the corresponding one of the m data transmission lines 84.

Comparator 112 has two input terminals and an output terminal. A first input terminal of comparator 112 is coupled to clock input node 104 through termination circuits 108. The second input terminal of comparator 112 is coupled to a third reference voltage level $V_{REF3}$. Third reference voltage level $V_{REF3}$ is between two voltage levels present upon clock transmission line 86 such that comparator 112 reproduces binary clock signal CLOCK at the output terminal.

Decode logic 114 receives the binary output signals produced by the m pairs of comparators 110 and the binary clock signal CLOCK reproduced by comparator 112. Decode logic 114 includes n flip-flops 116 controlled by clock signal CLOCK. Decode logic 114 uses the binary output signals received from the m pairs of comparators 110 to reproduce the n binary data signals DATA1 through DATAn, and produces the n binary data signals DATA1 through DATAn at output terminals of the n flip-flops 116 in response to clock signal CLOCK.

The n binary data signals DATA1 through DATAn simultaneously convey one of $2^n$ logical states. The m data transmission lines 84, each having one of three voltage levels present thereupon, simultaneously convey one of $3^m$ logical states. Thus the minimum value of m required to simultaneously convey one of $2^n$ logical states is the smallest integer greater than or equal to $\log_3(2^n)$. The present invention contemplates a digital communication system with at least one transmission line having one of p voltage levels present thereupon, where $p \geq 3$. In general, m data transmission lines having one of p voltage levels present thereupon simultaneously convey one of $p^m$ logical states. Thus the minimum value of m required to simultaneously convey one of $2^n$ logical states is the smallest integer greater than or equal to $\log_p(2^n)$.

Three binary data signals simultaneously convey one of $2^3$ (8) logical states, and two transmission lines having one of three voltage levels present thereupon simultaneously convey one of $3^2$ (9) logical states. Thus two transmission lines having one of three voltage levels present thereupon can convey the information of three binary data signals simultaneously, and can thus replace three binary transmission lines. Table 1 below shows logic levels which may be used to implement an exemplary communication system conveying three binary data signals over two transmission lines simultaneously, where DATA1, DATA2, and DATA3 are the logical levels of the three binary data signals, and T1 and T2 are the logical levels associated with the voltage levels present upon the two transmission lines.

TABLE 1

Logic Levels for an Exemplary Communication System.

| DATA1 | DATA2 | DATA3 | T1 | T2 |
|---|---|---|---|---|
| 0 | 0 | 0 | Logic LO (0) | Logic LO (0) |
| 0 | 0 | 1 | Logic LO (0) | Logic MID (1) |
| 0 | 1 | 0 | Logic LO (0) | Logic HI (2) |
| 0 | 1 | 1 | Logic MID (1) | Logic LO (0) |
| 1 | 0 | 0 | Logic MID (1) | Logic MID (1) |
| 1 | 0 | 1 | Logic MID (1) | Logic HI (2) |
| 1 | 1 | 0 | Logic HI (2) | Logic LO (0) |
| 1 | 1 | 1 | Logic HI (2) | Logic MID (1) |

The logic LO (0), MID (1), and HI (2) levels of the two transmission lines may be associated with the voltage levels indicated in FIGS. 5 and 7. It is noted that one logical state of the two transmission lines, where T1=logic HI (2) and T2=logic HI (2), is not used.

Using two transmission lines having one of three voltage levels present thereupon to replace three binary transmission lines represents a one-third reduction in the number of required signal paths between devices and a one-third savings in associated elements (e.g., signal/transmission lines, device package terminals, drive circuitry, receive circuitry, etc.) and the amount of physical space occupied by such elements. Alternately, an original number of signal paths may be retained, allowing an increase in the rate at which binary data may be transmitted from one device to another.

A data transmission scheme which uses ternary data signals to produce a voltage level transition every clock cycle in a data stream conveyed from one communication device to another will now be described. Control logic 50 of digital communication system 40 (FIGS. 4 and 6) may be configured to encode the binary data signals DATA into ternary signals in a manner which guarantees a voltage level transition upon transmission line 44 for every cycle of clock signal CLOCK1 even when the logic levels of the binary data signals DATA remain unchanged from one cycle of CLOCK1 to the next. Decode logic 66 (FIGS. 4 and 6) may be configured to reproduce the binary data signals DATA from the binary outputs of comparators 64a–b corresponding to ternary logic levels upon transmission line 44. The data transmission scheme greatly simplifies the tasks of generating clock signal CLOCK2 and synchronizing CLOCK2 to clock signal CLOCK1.

Figure 9:
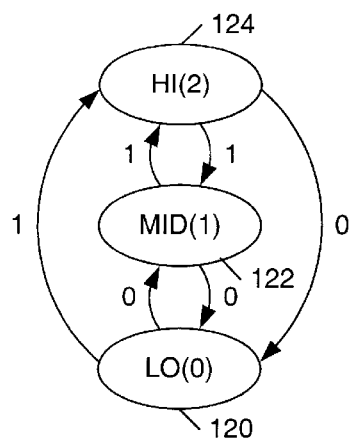
FIG. 9 is a state diagram of an exemplary state machine which may be embodied within control logic of the first communication device of FIG. 4 or FIG. 6 in order to implement a data transmission scheme which uses ternary data signals to produce a voltage level transition every clock cycle in a data stream conveyed from the first communication device to the second communication device.

FIG. 9 is a state diagram of an exemplary state machine which may be embodied within control logic 50 in order to implement the data transmission scheme described above. The state diagram includes three states: a first state 120, a second state 122, and a third state 124. A different voltage level is present upon transmission line 44 in each of the three states, and while in any one of the three states, a received binary data signal causes a transition to a different state such that a voltage level transition occurs upon transmission line 44. In state 120, control logic 50 causes the driver circuit of communication device 42a to produce the ternary logic LO (0) level at output node 48. (See FIGS. 5 and 7.) While in state 120, a received binary logic 0 causes a transition to state 122, and a received binary logic 1 causes a transition to state 124. In state 122, control logic 50 causes the driver circuit of communication device 42a to produce the ternary logic MID (1) level at output node 48. While in state 122, a received binary logic 0 causes a transition to state 120, and a received binary logic 1 causes a transition to state 124. In state 124, control logic 50 causes the driver circuit of communication device 42a to produce the ternary logic HI (2) level at output node 48. While in state 124, a received binary logic 0 causes a transition to state 120, and a received binary logic 1 causes a transition to state 122.

Figure 10:
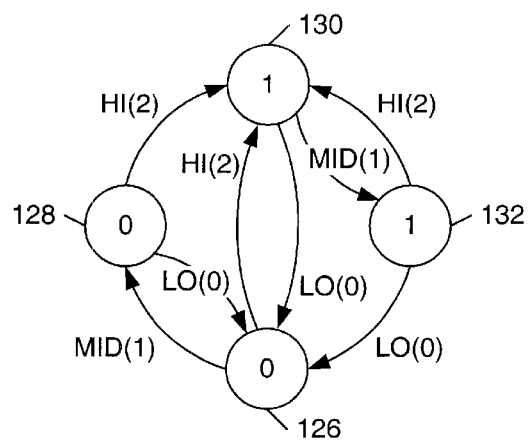
FIG. 10 is a state diagram of an exemplary state machine which may be embodied within decode logic of the second communication device of FIG. 4 or FIG. 6 in order to implement the data transmission scheme described above with regard to FIG. 9.

FIG. 10 is a state diagram of an exemplary state machine which may be embodied within decode logic 66 in order to implement the data transmission scheme described above. The state diagram includes four states: a first state 126, a second state 128, a third state 130, and a fourth state 132. In state 126, decode logic 66 produces a binary logic 0 data signal DATA. While in state 126, received binary outputs of comparators 64a–b corresponding to a ternary logic MID (1) level upon transmission line 44 cause a transition to state 128, and received binary outputs of comparators 64a–b corresponding to a ternary logic HI (2) level upon transmission line 44 cause a transition to state 130. In state 128, decode logic 66 produces a binary logic 0 data signal DATA. While in state 128, received binary outputs of comparators 64a–b corresponding to a ternary logic LO (0) level upon transmission line 44 cause a transition to state 126, and received binary outputs of comparators 64a–b corresponding to a ternary logic HI (2) level upon transmission line 44 cause a transition to state 130. In state 130, decode logic 66 produces a binary logic 1 data signal DATA. While in state 130, received binary outputs of comparators 64a–b corresponding to a ternary logic MID (1) level upon transmission line 44 cause a transition to state 132, and received binary outputs of comparators 64a–b corresponding to a ternary logic LO (0) level upon transmission line 44 cause a transition to state 126. In state 132, decode logic 66 produces a binary logic 1 data signal DATA. While in state 132, received binary outputs of comparators 64a–b corresponding to a ternary logic HI (2) level upon transmission line 44 cause a transition to state 130, and received binary outputs of comparators 64a–b corresponding to a ternary logic LO (0) level upon transmission line 44 cause a transition to state 126.

Figure 11:
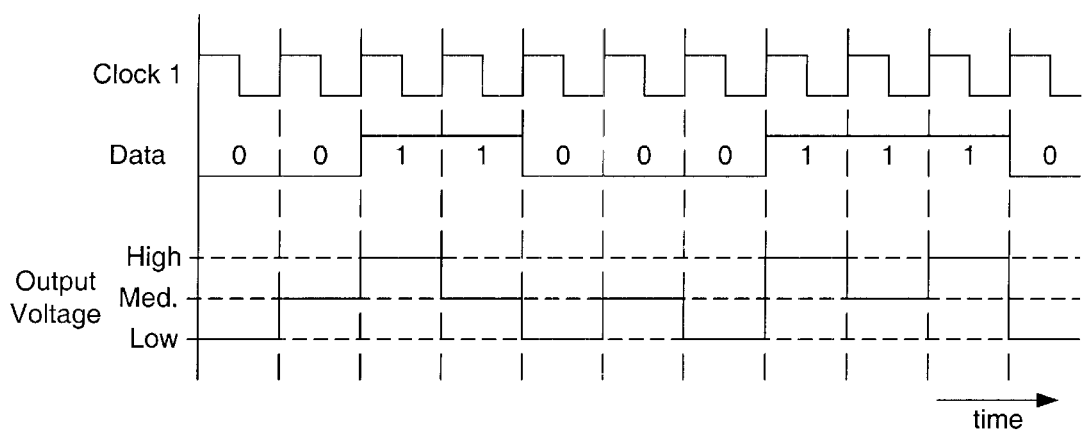
FIG. 11 is a graph of a clock signal CLOCK1, a binary data signal DATA, and an output voltage at an output node of the first communication device of FIG. 4 or FIG. 6 versus time illustrating the data transmission scheme described above with regard to FIG. 9.

FIG. 11 is a graph of the clock signal CLOCK1, binary data signal DATA, and the output voltage at output node 48 of communication device 42a versus time illustrating the data transmission scheme described above. In FIG. 11, the HIGH output voltage level at node 48 is associated with the ternary logic HI (2) level, the MEDIUM output voltage level is associated with the ternary logic MID (1) level, and the LOW output voltage level is associated with the ternary logic LO (0) level. (See FIGS. 5 and 7.) It is noted that the output voltage at output node 48 changes every cycle of clock signal CLOCK1 even when the logic levels of the binary data signals DATA remain unchanged from one cycle of CLOCK1 to the next.

In a method for implementing the data transmission scheme, control logic 50 of communication device 42a may encode the binary data signals DATA to form a ternary data stream including ternary data signals such that a voltage level transition occurs within the ternary data stream every cycle of clock signal CLOCK1 as described above and illustrated in FIG. 11. Communication device 42b may receive the ternary data stream (e.g., via transmission line 44) and synchronize clock signal CLOCK2 to clock signal CLOCK1 using the voltage level transitions occurring within the ternary data stream. Comparators 64a–b and decode logic 66 of communication device 42b may be used to decode the ternary data within the ternary data stream in response to clock signal CLOCK2 thereby reproducing the binary data signals DATA from the ternary data signals.

Figure 12:
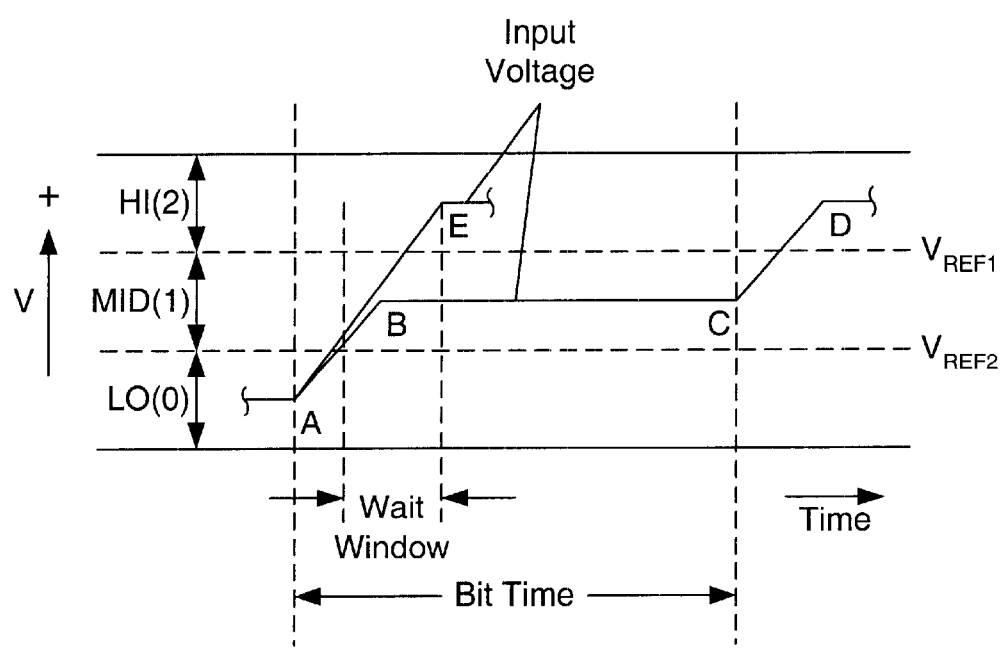
FIG. 12 is a graph of an input voltage at an input node of the second communication device versus time used to illustrate a method for decoding ternary data encoded within the output voltage of FIG. 11.

FIG. 12 is a graph of the input voltage at input node 60 of communication device 42b versus time used to illustrate an alternate method for using the outputs of comparators 64a–b to decode the ternary data within the ternary data stream of FIG. 11. Communication device 42b may receive the ternary data stream and produce the clock signal CLOCK2 delayed in time with respect to clock signal CLOCK1 (e.g., through the use of a delay lock loop or DLL). This would allow decode logic 66 to wait a fraction of a period of the clock signal CLOCK1 (i.e., a fraction of a bit time) labeled a "wait time" in FIG. 12 following the input voltage crossing one reference voltage threshold (i.e., $V_{REF1}$ or $V_{REF2}$) in order to determine if the input voltage crosses both reference voltage thresholds (i.e., $V_{REF1}$ and $V_{REF2}$) in the same bit time.

Referring to FIG. 12, decode logic 66 distinguishes and input voltage transition from the logic LO (0) level to the logic MID (1) level (i.e., an input voltage transition from point A to point B) from an input voltage transition from the logic LO (0) level to the logic HI (2) level (i.e., an input voltage transition from point A to point E) by waiting the wait time period after the input voltage crosses the $V_{REF2}$ threshold. If the input voltage does not cross the $V_{REF1}$ threshold during the wait time period, the input voltage transition is from the logic LO (0) level to the logic MID (1) level. On the other hand, if the input voltage crosses the $V_{REF1}$ threshold during the wait time period, the input voltage transition is from the logic LO (0) level to the logic HI (2) level. It is noted that the DLL may be used to set the wait window period dependent upon the rate of change of the input voltage, the $V_{REF1}$ and $V_{REF2}$ reference voltage levels, and the bit time.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A digital communication system, comprising:
   a first communication device having m data output nodes and a clock output node;
   a second communication device having m data input nodes and a clock input node, wherein each of the m data input nodes corresponds to a different one of the m data output nodes, and wherein the clock input node corresponds to the clock output node;
   m data transmission lines coupled between corresponding data output and input nodes, and a clock transmission line coupled between the clock output and input nodes;
   wherein the second communication device comprises an input section including m+1 termination resistors, wherein each of m of the m+1 termination resistors is coupled between a different one of the m data input nodes and a power supply voltage level, and wherein one of the m+1 termination resistors is coupled between the clock input node and the power supply voltage level;
   wherein an electrical voltage level existing at a given data input node is substantially dependent upon an amount of electrical current flowing through the termination resistor coupled between the given data input node and the power supply voltage level;
   wherein an electrical voltage level existing at the clock input node is substantially dependent upon an amount of electrical current flowing through the termination resistor coupled between the clock input node and the power supply voltage level;
   wherein the first communication device comprises an output section coupled to receive n binary data signals and a binary clock signal, and wherein the output section is configured to: (i) drive each of the m data output nodes in one of p drive states dependent upon the n binary data signals and in response to the binary clock signal, and wherein n>m and p≧3, and wherein each of the p drive states used to drive a given data output node causes a different amount of electrical current to flow through the termination resistor coupled to the corresponding data input node such that a different electrical voltage level exists at the corresponding data input node in each of the p drive states, and (ii) drive the clock output node in one of q drive states dependent upon the binary clock signal, and wherein q≧2, and wherein each of the q drive states causes a different amount of electrical current to flow through the termination resistor coupled to the clock input node such that a different electrical voltage level exists at the clock input node in each of the q drive states; and
   wherein the input section is configured to: (i) produce the binary clock signal from the electrical voltage levels existing at the clock input node, and (ii) produce the n binary data signals from the electrical voltage levels existing at the m data input nodes in response to the binary clock signal.

2. The digital communication system as recited in claim 1, wherein m is the smallest integer greater than or equal to $\log_p(2^n)$.

3. The digital communication system as recited in claim 1, wherein each transmission line is coupled to a different input node and has a characteristic impedance, and wherein a value of one of the m+1 termination resistor coupled to a given input node is substantially equal to the characteristic impedance of the transmission line coupled to the given input node.

4. The digital communication system as recited in claim 1, wherein the electrical voltage levels existing at a given data input node in each of the p drive states differ by substantially equal amounts.

5. A digital communication system, comprising:

a first communication device having m data output nodes and a clock output node;

a second communication device having m data input nodes and a clock input node, wherein each of the m data input nodes corresponds to a different one of the m data output nodes, and wherein the clock input node corresponds to the clock output node;

m data transmission lines coupled between corresponding data input and output nodes, and a clock transmission line coupled between the clock input node and the clock output node;

wherein the second communication device comprises an input section including 2m+1 termination resistors, wherein each of m of the termination resistors is coupled between a different one of the m data input nodes and a first power supply voltage level, and wherein each of m of the termination resistors is coupled between a different one of the m data input nodes and a second power supply voltage level, and wherein one of the 2m+1 termination resistors is coupled between the clock input node and the first power supply voltage level;

wherein an electrical voltage level existing at a given data input node is substantially dependent upon an amount of electrical current flowing through the termination resistor coupled between the given data input node and the first power supply voltage level;

wherein an electrical voltage level existing at the clock input node is substantially dependent upon an amount of electrical current flowing through the termination resistor coupled between the clock input node and the first power supply voltage level;

wherein the first communication device comprises an output section coupled to receive n binary data signals and a binary clock signal, and wherein the output section is configured to: (i) drive each of the m data output nodes in one of p drive states dependent upon the n binary data signals and in response to the binary clock signal, and wherein n>m and $p \geq 2$, and wherein each of the p drive states used to drive a given data output node causes a different amount of electrical current to flow through the termination resistor coupled to the corresponding data input node such that a different electrical voltage level exists at the corresponding data input node in each of the p drive states, and (ii) drive the clock output node in one of q drive states dependent upon the binary clock signal, and wherein $q \geq 1$, and wherein each of the q drive states causes a different amount of electrical current to flow through the termination resistor coupled to the clock input node such that a different electrical voltage level exists at the clock input node in each of the q drive states; and wherein the input section is configured to: (i) produce the binary clock signal from the electrical voltage levels existing at the clock input node, and (ii) produce the n binary data signals from the electrical voltage levels existing at the m data input nodes in response to the binary clock signal.

6. The digital communication system as recited in claim 5, wherein each data transmission line is coupled to a different data input node and has a characteristic impedance, and wherein each termination resistor coupled to a given data input node has a value substantially equal to twice the characteristic impedance of the data transmission line coupled to the given input node.

7. The digital communication system as recited in claim 5, wherein the clock transmission line has a characteristic impedance, and wherein the value of the termination resistor coupled between the clock input node and the first power supply voltage level is selected such that the input resistance at the clock input node is substantially equal to the characteristic impedance of the clock transmission line.

8. A digital communication system, comprising:

a first communication device having an output node coupled to a first end of a transmission line and a second communication device having an input node coupled to a second end of the transmission line;

wherein the first communication device includes an output section coupled to receive binary data and is configured to drive the output node in each of p drive levels, dependent upon the binary data, where $p \geq 3$;

wherein the first communication device is configured to convey a clock signal to said second communication device;

wherein the second communication device is configured to decode the p drive levels in response to the clock signal thereby reproducing the binary data; and wherein the first communication device comprises a plurality of resistors each controlled by a corresponding switch to selectively connect between the output node of the first communication device and a corresponding reference voltage.

9. The digital communication system as recited in claim 8, wherein each corresponding switch is controlled depending upon which of the p drive levels is driven on the output node of the first communication device.

10. The digital communication system as recited in claim 8, wherein the second communication device comprises a termination resistor coupled between the input node and a first power supply voltage level.

11. The digital communication system as recited in claim 10, wherein the second communication device includes an input section coupled to the input node and configured to produce the binary data from the different electrical voltage levels existing at the input node.

12. The digital communication system as recited in claim 8, wherein the first communication device is configured to encode the binary data to form a ternary data stream comprising ternary data such that a voltage level transition occurs within the ternary data stream every cycle of a first clock signal.

13. The digital communication system as recited in claim 12, further comprising:

the second communication device receiving the ternary data stream and synchronizing a second clock signal to the first clock signal using the voltage level transitions occurring within the ternary data stream; and the second communication device decoding the ternary data within the ternary data stream in response to the second clock signal thereby reproducing the binary data from the ternary data.

* * * * *